M. GALLY.
Governors.
No. 135,423.             Patented Feb. 4, 1873.
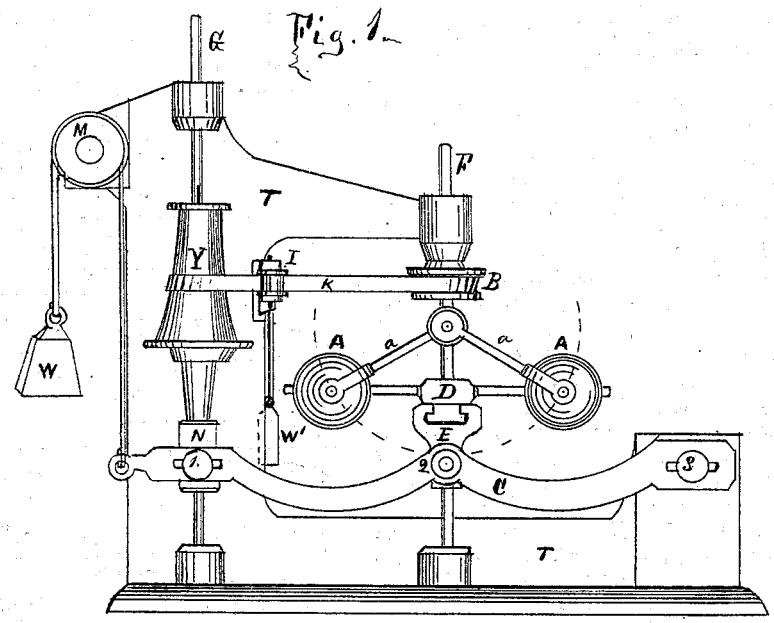
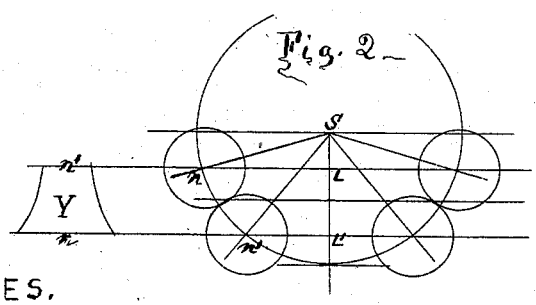
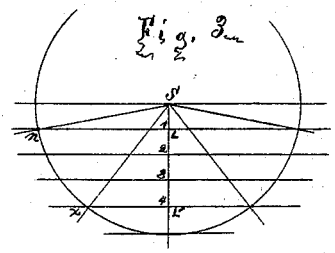
WITNESSES.  
Theodor C. H. Beck  
Edw. F. Brown
INVENTOR.  
Merritt Gally

UNITED STATES PATENT OFFICE.

MERRITT GALLY, OF ROCHESTER, NEW YORK.

IMPROVEMENT IN GOVERNORS.

Specification forming part of Letters Patent No. 135,423, dated February 4, 1873.

*To all whom it may concern:*

Be it known that I, MERRITT GALLY, of Rochester, in Monroe county and State of New York, have invented a new and useful mechanism for converting variable into invariable velocity; and I do hereby declare that the following is a full and exact description of the same, reference being had to the accompanying drawing and to the letters of reference marked thereon.

It is often desirable that a machine driven by power should have an exact and invariable speed, and therefore many attempts have been made to secure the desired end by the use of "automatic friction-brakes," with a view to regulate the constantly varying amount of power required during the different movements of machinery, such variation of the amount of power required greatly affecting the speed produced by the motor. As it is impossible to accurately calculate the amount of friction required under the many varying conditions of the machine, or under such shifting and varying conditions to ascertain with any accuracy whatever the amount of friction being applied, the failure of such efforts is obvious at the outset. There is also an unavoidable difficulty also in the application of steam or water governors in attempting to secure the desired result where any absolute accuracy is required; for although we may with mathematical accuracy calculate the exact rise and fall of the "governor-balls" at different variations of speed, or the exact plane in which they will revolve with any given velocity, nevertheless, as the movement of the machine to be affected must be operated upon through the water or steam, the conditions of the power of which are subject to constant variation, the result obtained can never be more than approximate, while absolute accuracy is impossible.

My invention differs from all others, first, in the fact that I make no attempt whatever to govern or vary the source of power, or control in any manner the motor.

The object of my invention is to take speed resulting from power being exerted upon a moving body, whatever the source of such power may be or however variable its conditions, and, if such speed be variable, to convert it into accurate invariable velocity. This I do with mathematical accuracy by constructing my device wholly upon mathematical principles.

In the accompanying drawing, Figure 1 represents the entire device by a side elevation showing all the parts. Fig. 2 is a diagram employed in the forming of the curved wheel Y, the several diameters calculated from the several speeds of the balls; and Fig. 3 is a diagram which illustrates the mathematical formula written under Fig. 2.

In Fig. 1 F represents a shaft driven by power and with a variable velocity. The velocity of this shaft may at any time be determined by attaching to it the common revolving pendulum or governor balls, and considering the plane in which they revolve in relation to their point of suspension, and taking into consideration the length of the rods. I will explain this by means of diagram, Fig. 3. I make $n$ and $n'$ to represent the positions of the governor-balls at their extremes of rise or fall, and S to represent the point of suspension. Let us now divide the cone formed by the revolving rods when the balls are at their lowest plane into any number of equal parts, four such being represented in the diagram. These divisions will represent four of the several planes in which the balls may revolve. Now, let us suppose the rods to be of such length that the revolutions of the balls at $n$ will be one hundred per minute. Now, if we wish to find the speed of the balls in any other plane, we proceed as follows: Say the plane be that of $n'$, we first represent the part of the perpendicular of the cone S $n$ $n'$, which is cut off by the plane $n$, by L, and the perpendicular of S $n$ $n'$ by $L'$; we then have the proportion—

$$n : n' :: \sqrt{S L'} : \sqrt{S L}.$$

Now, $n$ being equal to 100, we have—

$$100 : n' :: \sqrt{S L'} : \sqrt{S L}.$$

Let $x$ = the unknown speed $n'$;
L = one part of the known perpendicular; and
$L'$ = four parts of the known perpendicular.
We then have—

$$100 : x :: \sqrt{4} : \sqrt{1};$$

and we find—

$$x = 50.$$

In like manner we may determine the speed of the balls in any desired plane; or by transposing the terms of the formula we may ascertain the position of any plane, the speed being known.

To find the position of the plane L', the position of L and the speeds $n$ and $n'$ being given, we have the formula—

$$n : n' :: x : \sqrt{1},$$

giving—

$$L=1 \text{ and } L'=4.$$

Having attached the governor-balls to the shaft F I place upon this shaft a fixed pulley or wheel, the speed of which will always be indicated by the position of the plane in which the balls are revolving. I now place an elongated wheel or pulley upon a shaft, G, to which I wish to give an invariable speed, and make such wheel or pulley to slide on a feather, as Y, and connect this wheel by friction-gear or belt with the fixed wheel of the variable shaft. I now make the several diameters of the sliding-wheel to exactly correspond with the several speeds of the balls in their several planes. This is determined by use of the same mathematical formula used in respect to the balls, and I find that I have a curved-faced conoidal wheel, which has its greatest concavity nearest its greatest diameter. In order to produce a sliding movement of the curved-faced wheel which shall exactly correspond with the rise and fall of the balls I must secure a point of attachment with the balls which shall always be in the plane in which the balls are at the time revolving. This I do by means of a transverse rod, D, passing through the balls, and upon which the balls are allowed to slide. The object of this rod is not to in any way affect the movement of the balls, nor for the attachment of springs, or anything of the kind; and must not, therefore, be in any way confounded with the radial rods of radial governors. To this cross-rod I attach by swivel a lever, C, which acts upon the curved-face wheel Y and causes it to slide up or down in proportion to the movement of the balls; and as the curved pulley is constructed mathematically to compare exactly with the several speeds of the balls in their several planes the shaft of the curved wheel must of necessity always preserve an exact invariable velocity, while the power-shaft may vary anywhere between the extreme velocities of the balls. The weight of the curved pulley and lever with their attachments I exactly balance with counter-weight W, and when a belt is used to connect the pulleys I use a weighted belt-tightener, I, to prevent slipping.

It will be seen that the main features of my invention consist in the mathematical construction and arrangement of its several parts, and that the instrument must be accurate in its operations.

Claims.

1. In combination with the revolving pendulum or governor balls A A and shaft F, the curved-faced or conoidal wheel Y, substantially as and for the purpose specified.

2. The method described of connecting the governor-balls and conoidal wheel, and securing the point of attachment correspondent at all times with the plane of said balls, by means of the several devices constructed and arranged substantially as herein set forth, for the purpose of converting a variable into an invariable velocity.

MERRITT GALLY.

Witnesses:
 THEODOR C. H. BECK,
 EDM. F. BROWN.